(12) United States Patent
Klinkenberg et al.

(10) Patent No.: US 8,734,601 B2
(45) Date of Patent: May 27, 2014

(54) METHOD FOR HOT ROLLING A METAL SLAB, STRIP OR SHEET

(75) Inventors: Christian Klinkenberg, Herdecke (DE); Christian Bilgen, Düsseldorf (DE); Dieter Rosenthal, Niederfischbach (DE); Christoph Klein, Kreutzal-Eichen (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 13/513,749

(22) PCT Filed: Dec. 2, 2010

(86) PCT No.: PCT/EP2010/068691
§ 371 (c)(1), (2), (4) Date: Aug. 2, 2012

(87) PCT Pub. No.: WO2011/067315
PCT Pub. Date: Jun. 9, 2011

(65) Prior Publication Data
US 2013/0042950 A1    Feb. 21, 2013

(30) Foreign Application Priority Data
Dec. 2, 2009   (DE) .......................... 10 2009 057 524

(51) Int. Cl.
*C21D 8/02*   (2006.01)
*B21B 1/26*   (2006.01)

(52) U.S. Cl.
USPC ............. 148/541; 148/602; 148/654; 72/226; 72/234; 72/220

(58) Field of Classification Search
CPC ...... B21B 1/26; C21D 8/0226; C21D 8/0263; C21D 8/0273; C21D 9/0012
USPC ................. 148/541, 602, 654; 266/114, 103; 72/226, 234, 220
See application file for complete search history.

(56) References Cited

U.S. PATENT DOCUMENTS

| | | | |
|---|---|---|---|
| 4,433,565 A * | 2/1984 | Preller | 72/177 |
| 5,611,232 A | 3/1997 | Rohde et al. | |
| 5,802,902 A | 9/1998 | Rosenthal et al. | |
| 8,011,418 B2 | 9/2011 | Rosenthal et al. | |
| 2001/0004910 A1 * | 6/2001 | Yasuhara et al. | 148/546 |
| 2005/0115649 A1 | 6/2005 | Tokarz et al. | |

(Continued)

FOREIGN PATENT DOCUMENTS

| | | |
|---|---|---|
| AU | 624831 | 6/1992 |
| DE | 4028542 | 3/1992 |

(Continued)

*Primary Examiner* — Deborah Yee
(74) *Attorney, Agent, or Firm* — Lucas & Mercanti, LLP; Klaus P. Stoffel

(57) ABSTRACT

A method for hot rolling a metal strip or metal sheet, wherein 1.a) the slab or the strip or sheet is subjected in a first step to one or more reshaping actions in a hot rolling mill for producing a uniform, fine, recrystallised austenite structure and 2) the slab or the strip or sheet is then subjected in a second step to cooling for producing a fine-grain structure. The slab or the strip or sheet is subjected to heating between at least two roll stands of the hot rolling mill during performance of the step 1.a). The roll stands are arranged to follow one another in a rolling direction and in each of which the slab or the strip or sheet is subjected to reshaping. A heater for heating the rolling stock is arranged between at least two of the roll stands.

5 Claims, 2 Drawing Sheets

(56) References Cited

U.S. PATENT DOCUMENTS

2009/0320546 A1 * 12/2009 Seidel et al. .................. 72/200
2010/0212856 A1    8/2010 Rosenthal et al.

FOREIGN PATENT DOCUMENTS

| DE | 4402402 | | 8/1995 |
|----|---------|---|--------|
| DE | 102008020412 | | 2/2009 |
| EP | 0595282 | | 5/1994 |
| EP | 0771595 | | 5/1997 |
| EP | 0870553 | | 10/1998 |
| EP | 1001041 | | 5/2000 |
| JP | 54-99758 | * | 5/1986 |
| WO | 8911383 | | 11/1989 |
| WO | 2007051521 | | 5/2007 |
| WO | 2007072516 | | 6/2007 |
| WO | 2007073841 A | | 7/2007 |

* cited by examiner ns. 2, 2009, the
METHOD FOR HOT ROLLING A METAL SLAB, STRIP OR SHEET The present application is a 371 of International application PCT/EP2010/068691, filed Dec. 2, 2010, which claims priority of DE 10 2009 057 524.3, filed Dec. 2, 2009, the priority of these applications is hereby claimed and these applications are incorporated herein by reference.

BACKGROUND OF THE INVENTION

The invention relates to a method of hot rolling a metal strip or metal sheet, particularly a steel strip or steel sheet, wherein
1.a) the slab or the strip or sheet is subjected in a first step to one or more reshaping actions in a hot rolling mill for producing a uniform, fine-grain austenite structure and
2) the slab or the strip or sheet is then subjected in a further step to cooling for producing a fine-grain structure.

The production of steel strip or steel sheet by hot rolling has been described in the prior art for a long time. Corresponding disclosures are found in, for example: the paper of P. Uranga, A. I. et al., 'Improvement of Microstructural Homogeneity in Thermomechanical Processed Ng Steels by Thin Slab Casting', 43rd Mechanical Working and Steel Processing Conference. Charlotte, ISS, Vol. 39, pages 511 to 529; the paper of C. Klinkenberg at al., 'Processing of Niobium Microalloyed API Grade Steel on a Thin Slab Plant', Materials Science Forum, Vols. 500 to 501, 2005. pages 253 to 260; and the paper of S. V. Subramanian et al., 'Process modelling of microalloyed steel for near net shape casting'. Proceedings of the International Conference on Thermomechanical Processing: Mechanics, Microstructure, ed. by E. J Palmiere et al., The University of Sheffield, Sheffield, 2003, pages 148 to 156.

A typical application of the thermomechanical method (TM method) is the production of hot-rolled steel strip and steel sheet from microalloyed steels. Such a TM treatment usually consist of the following steps:

One or more reshapings of the austenitic initial structure are carried out in the recrystallisation temperature range in a first step 1.a for producing a uniform, fine, recrystallised austenite structure. One or more reshapings of the recrystallised, austenitic structure for producing a high-dislocation, non-recrystallised austenite structure extended in area as much as possible (so-termed pancake structure) can then be carried out in a step 1.b. This first step is also termed conditioning of the austenite.

Finally, cooling of the austenitic structure conditioned by means of the first step is carried out in a second step for producing a fine-grain structure in the finished hot strip or hot sheet with the phase conversion.

The structure of the finished hot strip or hot sheet consists of the combination of ferrite, perlite, bainite and martensite, wherein the content of these four structural components can respectively be between 0% and 100%.

In accordance with the aforesaid description of the TM method, it is also possible to dispense with the afore-mentioned step 1.b of reshaping in the non-recrystallising temperature range of the austenite. In this case, conditioning of the austenite takes place entirely in the recrystallising temperature range of the austenite.

However, the difficulty with thermomechanical hot rolling is that for producing the uniform fine recrystallised austenite grain in the recrystallising range (the above step 1.a) a largest possible reshaping has to be undertaken. A fine recrystallised structure is distinguished by the fact that not only the former, non-uniform cast structure, but also individual coarse grains or structure regions have to be completely transformed into a uniform, fine recrystallised structure with small scatter around the mean grain size. This condition frequently is not fulfilled or is fulfilled incompletely and leads to an inadequately conditioned austenite structure.

If a step 1.b in the non-recrystallising temperature range of the austenite follows on the first step 1.a of hot rolling in the recrystallising temperature range of the austenite, often only a little residual reshaping for the succeeding reshaping actions in the said step 1.b of the thermomechanical treatment remains when there is a large ratio of the thickness of the finished hot strip or hot sheet and the thickness of the slab or the intermediate strip. Even when individual stands are taken out of action this on occasion is not sufficient to transform possibly still present residues of the cast structure as well as individual coarse grains or structure regions into a uniform flat pancake structure of non-recrystallised austenite grains. An insufficiently conditioned austenite is also present in this case.

Inadequately conditioned austenite has the disadvantageous consequence in the finished hot strip or hot sheet of individual coarser grains outside the normal distribution about the mean grain size and/or of structure regions having a substructure characterised by small-angle grain boundaries. However, structure regions of that kind lead to deterioration in the mechanical properties of the strip or sheet, particularly to a reduced toughness.

in correspondence with the preceding description of the TM method, in the above-mentioned step 1.a of the method the reshaping in the recrystallising range of the austenite is of critical importance for the characteristics of the finished steel strip or sheet. The degree of reshaping required in step 1.a of the thermomechanical treatment can, in fact, be replaced in part by an elevated entry temperature. However, this possibility is limited by the maximum furnace temperature as well as by the cooling at the time of contact with the roll and by thermal radiation between the stands when several stands participate in this step.

SUMMARY OF THE INVENTION

The present invention therefore has the object of proposing a method of the kind stated in the introduction which avoids the stated disadvantages. Accordingly, economic production of, in particular, thermomechanically rolled steel strip or steel sheet with simultaneous improvement of structure and mechanical properties shall be made possible A further object of the present invention is to make available plant concepts which are in a position of carrying out the method according to the invention and which are particularly simple in their structure and diversity of use and moreover require only a small constructional space.

Fulfilment of this object by the invention is, from the aspect of the method, characterised in that in the performance of the above-mentioned step 1.a the slab or the strip is subjected to heating between at least two roll stands (3, 4, 5, 6) of the hot rolling mill (2) when step 1.a is carried out.

Preferably, at least two roll stands (F1, F2) participate.

The reshaping is preferably carried out in all participating stands at above 1,000° C. namely the preferred stand entry temperature. It is thereby advantageously ensured that rolling is continuously undertaken in the recrystallising range; accordingly, all reshaping actions lead to a recrystallised structure.

Relative pass reductions of preferably ≥25% are for preference carried out in alt participating stands. It is thereby advantageously ensured that rolling is similarly carried out continuously in the recrystallising range due to the high dislocation density introduced into the material and due to the material heating, which is connected therewith, as a consequence of internal friction.

A completely recrystallised, fine-grain austenitic structure with only small tolerance around the mean grain size is preferably present at the end of step 1.a. Starting from a cast structure with a mean grain diameter of usually 500 to 2,000 microns, in which the large grains occur particularly in the slab centre, recrystallised structures with a grain size of 40 microns±approximately 20 microns are preferably achieved. Grain sizes of 30 microns±approximately 10 microns are obtained particularly with microalloyed steels, primarily API materials.

For preference, no residue of the cast structure is present at the end of step 1.a. Optionally added microalloying elements are preferably at least almost entirely in solution, especially >90% of the respective analysis content, at the end of step 1.a.

Understood as heating in the sense according to the invention are all selectively undertaken measures in which compensation for temperature losses between the stands is carried out to the extent that a complete recrystallisation and elimination of the cast structure take place for a given deformation, between-stand time and initial grain size.

The supplied energy required for complete recrystallisation and elimination of the cast structure is preferably introduced by a suitable combination of deforming energy, thermal energy and between-stand time in such a manner that a complete recrystallisation and elimination of the cast structure takes place.

To enable complete recrystallisation of the austenite in all stands participating in step 1.a the strip or sheet is subjected to heating between the first and second stand or succeeding stands. To be understood by heating in this connection is such a heating of the strip 1 that a targeted guidance of temperature can be set. This can also embrace maintenance of the temperature of the strip 1 at a desired, constant level (compensation for the temperature loss between the stands) or, however, a reduced cooling of the strip 1 by way of suitable heating elements.

From the aspect of plant, the object is fulfilled by a hot rolling mill for hot rolling a metal strip or metal sheet in which heating means for heating the rolling stock is arranged between at least two of the roll stands participating in the step 1.a.

In that case, the heating is preferably carried out by way of induction. For preference it is carried out up to the recrystallising temperature range, particularly up to complete recrystallisation of the rolling stock and up to complete elimination of the cast structure.

Cooling of the slab or of the strip or sheet can be carried out after the heating according to the above step 1.a and before carrying out the optional step 1.b. In that case, cooling of the slab or of the strip or sheet is preferably undertaken in the non-recrystallising temperature range.

If a reshaping action according to the above-mentioned step 1.b follows the reshaping action according to the abovementioned step 1.a, forced cooling, preferably with water, in the non-recrystallising temperature range of the austenite is carried out after the reshaping. This temperature range varies depending on the steel breakdown, the degree of reshaping and the time between passes. For this purpose, after the reshaping action in correspondence with step 1.a a stand is optionally opened up and the intermediate strip is intensively cooled before and/or behind the following stand so that the entry temperature for the reshaping process according to step 1.b takes place at a temperature below the recrystallisation temperature of the deformed austenite, preferably >1,000° C., with particular preference >900° C.

Cooling of the austenitic structure conditioned by means of the first step finally takes place in a second step for producing a fine-grain structure in the finished hot strip or hot sheet.

After production of the hot strip or hot sheet the structure thereof preferably exhibits exclusively one of the components, and/or combinations of the components, of austenite, ferrite, perlite, bainite and martensite, wherein the content of these structural components can respectively be between 0% and 100%. The microstructure is distinguished particularly by the fact that no individual coarse grains or larger structure regions are present with grain boundaries and/or a substructure characterised by small-angle grain boundaries.

The method is further distinguished by the fact that use is preferably made of a thin slab as starting product, which for preference has a cast thickness of ≤120 millimeters, and/or that this thin slab is preferably processed directly from the casting heat.

In terms of plant use is preferably made of a multi-stand continuous train as rolling plant and within this the method steps 1.a of rolling at high temperature with the assistance of induction heating, optional cooling, and 1.b of rolling at low temperature are preferably employed. Thus, there is no use here of a roughing stand or heavy plate stand as is known from the prior art.

The reshaping steps, consisting of the part steps 1.a and optionally 1.a plus 1.b, are preferably coupled, i.e. all participating stands are simultaneously in action after the slab or intermediate strip entry. In this connection, the roll stands are driven in tandem operation, thus in a mode of operation in which the slab or the intermediate strip passes through all roll stands simultaneously. However, in this regard, individual stands can also be opened up and accordingly not participate in the reshaping work.

The method according to the invention can be used flexibly, i.e. also for the production of thin final thicknesses. In this connection, the third stand is actively employed for rolling.

Moreover, in endless operation it is possible not to divide up the cast strip into slabs by cross-cutting, but instead to feed it continuously to the hot rolling mill, preferably via a tunnel furnace, finish-roll it to hot strip, cool it, cross-cut it only before the coiler and subsequently wind it up to form coils. This procedure reduces the incidence of scrap, since there are no head and foot ends at the strip. In addition, thinner strip thicknesses, preferably <1 millimeter thickness, can also be produced, since the risk of cobbles at the time of entry of thin strips into the last stands of the hot rolling mill is confined to the start-up. In the case of endless rolling the intake speed of the first active stand is reduced to the casting speed, which can lead to increased temperature losses before and/or during the hot rolling. Higher rolling temperatures are therefore required for the rolling in accordance with the above-mentioned step 1 so as to avoid final rolling temperatures in the ferrite phase and/or in the two-phase region of austenite plus ferrite.

The method according to the invention also allows production of steel categories with a reduced austenite phase region, for example with silicon contents >1.0%. Higher rolling temperatures are here needed for rolling according to the above-mentioned step 1.a, preferably 1.a and 1.b, in order to avoid final rolling temperatures in the ferrite phase and/or in the two-phase region of austenite plus ferrite.

According to the invention the hot rolling mill for hot rolling a metal strip or metal sheet, particularly a steel strip or steel sheet, with at least two roll stands, which are arranged in succession in rolling direction and in each of which the slab or the strip or sheet can be subjected to a reshaping action, is distinguished by the fact that heating means for heating the rolling stock is arranged between at least two of the at least two roil stands.

In that case the heating means is preferably constructed as induction heating means, particularly with up to four inductor elements. In the design of the inductor heating means, the object is always a construction, which is as compact as possible, with high intensity of energy. This energy intensity is preferably in the range of at least 3,000 MW/m$^2$, preferably at least 4,000 MW/m$^2$, measured with the energy intensity actually induced in the strip. The inductor element in that case denotes that component by way of which the energy is introduced into the strip. A plurality of inductor elements can thus form an induction heating means.

In addition, a cooling path for the slab or the strip or sheet can be arranged between two further roll stands or after at least one further roll stand. Insofar as a sufficient spacing is present with respect to the succeeding stand, it is also possible in accordance with a further embodiment of the invention to provide for the cooling path for the slab or the strip or sheet to be arranged directly behind the heating means in rolling direction.

Accordingly, the invention is preferably tailored to the installation of a rapid heating means (microbooster) in the form of, for example, inductive heating elements between individual stands of the hot rolling mill. It is thus possible for the slab or the strip or sheet to enter the hot rolling train at a relatively low temperature (in a given case also in the non-recrystallising temperature range). Reshaping energy is stored in the first stands (F0 and possibly also F1 or F2) in the case of impeded recrystallisation. The intermediate strip is heated up between the first and second stand (between F0 and F1) or also between the second and the third stand (between F1 and F2) by means of the provided heating elements and, in particular, selectively to the recrystallising temperature range.

After reshaping and complete recrystallisation in accordance with the above-mentioned step 1.a the intermediate strip is optionally cooled in the non-recrystallising temperature range by means of between-stand cooling and is rolled in correspondence with the above-mentioned step 1.b.

An adapted temperature guidance for producing an optimally conditioned austenitic structure is thus achieved during the thermomechanical treatment.

An economic thermomechanical hot rolling method for producing hot rolled steel strip or steel sheet with an improved structure and improved mechanical properties advantageously results from the proposed solution. The temperature guidance, which is possible in selective manner by the heating, of the slab or the strip or sheet opens up, inter alia, a savings potential with respect to microalloying elements and rolling energy. Moreover, the method according to the invention can be used without problems by only slight constructional changes to existing hot strip trains and by appropriate retrofitting.

In this connection, a further particular advantage of the invention is represented by the special flexibility with retrofitting in the context of redesign of hot strip trains by virtue of the small constructional length of the individual components and the multiplicity of possible insert units in combination with the heating between at least two roll stands. In particular, devices for the elimination or at least minimisation of ski-ups, drive roller pairs, cooling means, scale washers, cutters or the like can be implemented at suitable points in the hot strip train, whereby a multiplicity of advantageous effects can be achieved with only low outlay.

The invention can thus not only be incorporated in existing hot strip trains, but it also makes possible an economic design of a new production plant for a smaller slab thickness and/or with less strong roll stands, particularly the stands F0, F1 and F2.

BRIEF DESCRIPTION OF THE DRAWING

A number of embodiments of the invention is illustrated in the figures, in which.

DETAILED DESCRIPTION OF THE INVENTION

Figure 1:
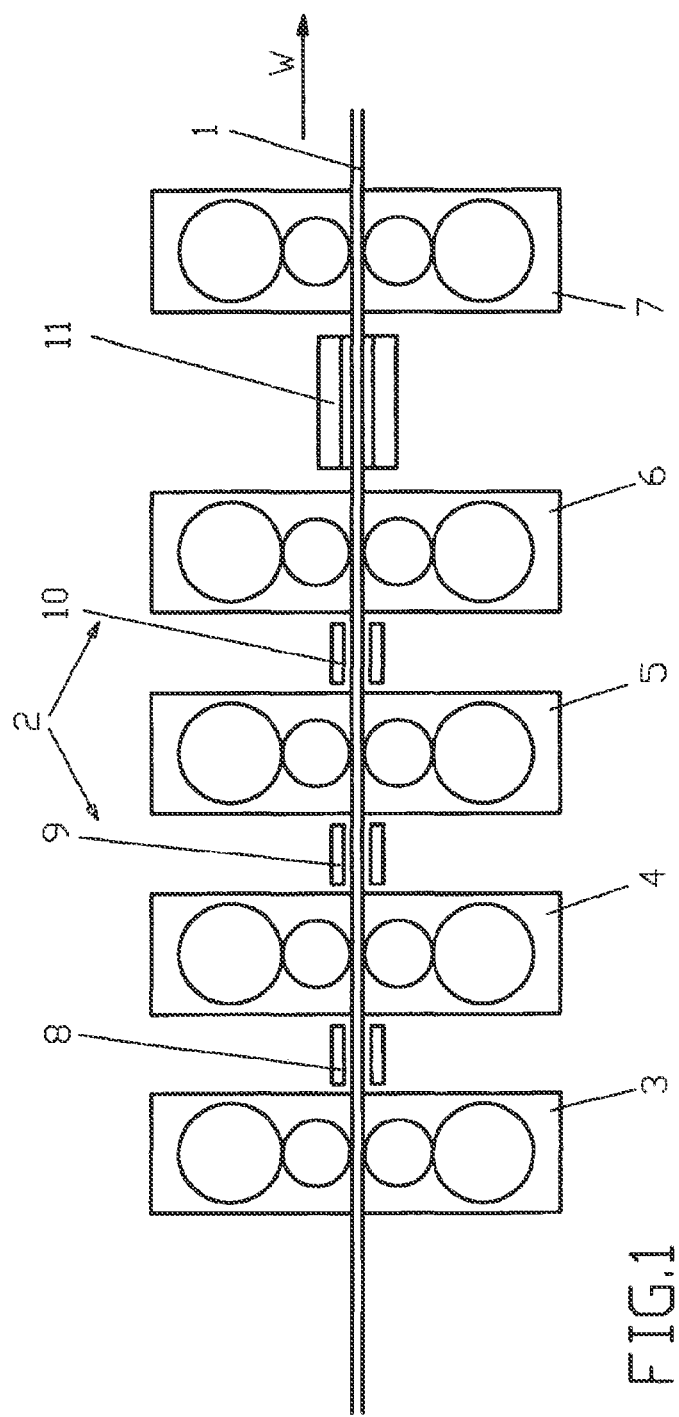
FIG. 1 shows, schematically, a hot rolling mill for thermomechanical processing of a slab for production of a hot rolled steel strip, in a first embodiment.

A hot rolling mill 2 in which a strip 1 can be rolled, is schematically illustrated in FIG. 1. For this purpose a number of roll stands 3, 4, 5, 6 and 7 (also called F0, F1, F2, F3 and F4) is present, by which the strip 1 can be individually conveyed in rolling direction W and in that case rolled in known manner. The strip 1 during hot rolling is subjected to a thermomechanical processing in order to produce a hot rolled steel strip. Only the first step of the thermomechanical treatment is illustrated. The strip 1 is thereafter subjected to a number of reshaping actions which are performed by the individual roll stands 3, 4, 5, 6 and 7. In this connection, the austenitic starting structure is sufficiently heated so as to be in the recrystallising temperature range. The production of a uniform, fine recrystallised austenite structure is thereby achieved in known manner. Not shown—this step follows the plant part illustrated in FIG. 1—is that in an above-mentioned optional step 1.b one or more reshapings of the recrystallised austenitic structure in the non-recrystallising temperature range can be carried out for producing a so-termed pancake structure. Cooling of the austenitic structure conditioned in correspondence with step 1.a and optionally 1.b is carried in a further step 2. A fine-grain structure can thus be produced in the subsequent phase conversion from austenite to ferrite. In that case it is significant that in the course of performance of the said step 1.a the strip 1 is subjected to heating between at least two roll stands, in the present case between the roll stands 3 and 4, 4 and 5 as well as 5 and 6, in the hot rolling mill 2. By heating there is understood in this connection such a heating up of the strip 1 that a targeted guidance of temperature can be set. This can also embrace maintenance of the temperature of the strip 1 at a desired constant level or, however, a reduced cooling of the strip 1, by means of suitable heating elements. Provided for this purpose are induction heating elements 8, 9 and 10 by which the temperature of the strip 1 can be set in a short time in the desired manner, namely to that at which complete recrystallisation takes place. However, arranged behind the roll stand 6 and in front of the roll stand 7 is a cooling path 11 by which the strip 1 can on the other hand be cooled to a desired temperature, namely to a temperature which does not lie in the recrystallising range.

Figure 2:
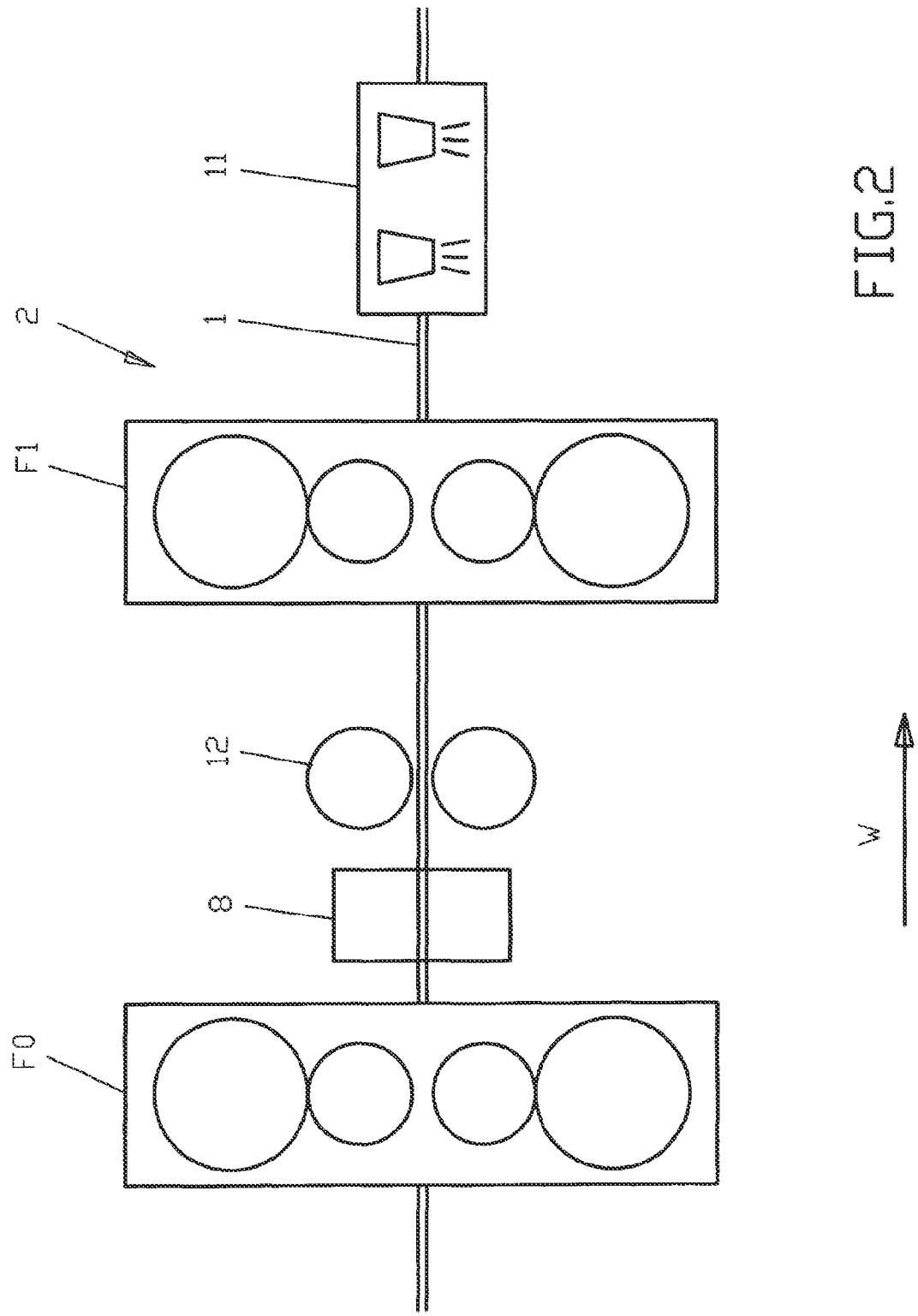
FIG. 2 shows a second embodiment of the invention, in which an induction heating means and a drive roller pair are arranged between two stands of a schematically illustrated hot strip train.

FIG. 2 shows a part of a hot rolling mill 2 in a second form of embodiment according to the invention in which the metal strip runs through a first roll stand designated F0 and a second roll stand designated F1. Directly after exit from the roughing stand F0 the strip 1 enters an induction heating means 8 and subsequently a drive roller pair 12. A minimal tension regulation is applied to the strip 1 by this drive roller pair 12 and, in addition, water remaining on the strip 1 is easily squeezed off. Such a drive roller pair 12 is thus to be regarded as an alternative solution to a looper (not illustrated), in which slight fluctuations in strip tension or in strip length can be absorbed. Finally, arranged behind the roll stand F1 in rolling direction W is a cooling path 11 by way of which the strip 1 heated in the heating device 8 to a temperature above the recrystallisation temperature can be cooled down to a temperature range in the non-recrystallising range.

The invention claimed is:

1. Method of hot rolling a slab or strip or sheet of metal, wherein
   1.a) the slab or strip or sheet after casting is subjected to one or more deformations in a hot rolling mill comprising a series of roll stands for completely eliminating a cast structure and for producing a uniform, fine, recrystallized austenite structure with a grain size of 40 µm+/−20 µm, and in micro-alloyed steel with a grain size of 30 µm±10 µm, wherein >90% of micro-alloying elements in the steel at the end of this step have been dissolved, and
   2) the slab or the strip or the sheet is then subjected to cooling in a second step for producing a fine-grain microstructure in which no individual coarse grains are present, whose grain limits are characterized by small angle grain limits, wherein between at least two roll stands of the hot rolling mill, the slab or strip or sheet is subjected to heating while step 1.a) is carried out, and wherein, in at least the first roll stand in the rolling direction the upper and lower work rolls are driven through separate drives, wherein directly after exiting from a roughening stand, the slab or the strip or the sheet is pulled by a pair of drive rollers into an induction heating unit and subsequently, and the slab or strip or sheet is in a step 1.b between the steps 1.a) and 2) subjected to one or more deformations of the recrystallized austenitic structure for producing a flatly stretched austenite structure, and wherein heating is carried out into a recrystallized temperature area, up to complete recrystallization.

2. Method according to claim 1, wherein a descaling wash is carried out after heating.

3. Method according to claim 1, wherein the slab, the strip or the sheet is cropped prior to heating.

4. Method according to claim 1, wherein the deformation steps comprised of the steps 1.a) and 1.b, are coupled, wherein all participating stands are simultaneously in engagement with the slab or the strip or the sheet after entry.

5. Method according to claim 4, wherein the individual stands can be opened.

* * * * *